US012639555B2

(12) United States Patent
Lee et al.

(10) Patent No.: US 12,639,555 B2
(45) Date of Patent: May 26, 2026

(54) METHOD AND DEVICE FOR OPTIMIZING NEURAL NETWORK MODEL

(71) Applicant: EL ROI LAB INC., Seoul (KR)

(72) Inventors: Jungi Lee, Seoul (KR); Ji Seong Yoon, Seoul (KR); Myoung Hwan Kim, Seoul (KR); Jeong Hyeon Park, Seoul (KR); Kwangsun Yoo, Incheon (KR); Seok Joo Byun, Gyeonggi-do (KR)

(73) Assignee: EL ROI LAB INC., Seoul (KR)

( * ) Notice: Subject to any disclaimer, the term of this patent is extended or adjusted under 35 U.S.C. 154(b) by 0 days.

(21) Appl. No.: 19/204,647

(22) Filed: May 12, 2025

(65) Prior Publication Data

US 2025/0348714 A1 Nov. 13, 2025

(30) Foreign Application Priority Data

May 10, 2024 (KR) ......................... 10-2024-0061725

(51) Int. Cl.
*G06N 3/048* (2023.01)
*G06N 3/0495* (2023.01)

(52) U.S. Cl.
CPC ........... *G06N 3/048* (2023.01); *G06N 3/0495* (2023.01)

(58) Field of Classification Search
CPC .............................. G06N 3/048; G06N 3/0495
See application file for complete search history.

(56) References Cited

U.S. PATENT DOCUMENTS

| | | | |
|---|---|---|---|
| 2021/0150347 A1* | 5/2021 | Borse | G06N 3/045 |
| 2021/0182685 A1* | 6/2021 | Xiao | G06N 3/048 |
| 2022/0327386 A1* | 10/2022 | Ben-dror | G06N 3/082 |

FOREIGN PATENT DOCUMENTS

KR    10-2022-0139248 A    10/2022

OTHER PUBLICATIONS

Montalbo, Francis Jesmar P. "Fusing compressed deep ConvNets with a self-normalizing residual block and alpha dropout for a cost-efficient classification and diagnosis of gastrointestinal tract diseases." MethodsX 9 (2022): 101925. (Year: 2022).*
Yu, Xiaohong, et al. "Improving the performance of convolutional neural networks by fusing low-level features with different scales in the preceding stage." IEEE Access 9 (2021): 70273-70285. (Year: 2021).*
Nguyen, Dang, et al. "On cross-layer alignment for model fusion of heterogeneous neural networks." ICASSP 2023-2023 IEEE International Conference on Acoustics, Speech and Signal Processing (ICASSP). IEEE, 2023. (Year: 2023).*
O'Neill, James, Greg Ver Steeg, and Aram Galstyan. "Compressing Deep Neural Networks via Layer Fusion." (2020). (Year: 2020).*
Singh, Sidak Pal, and Martin Jaggi. "Model fusion via optimal transport." Advances in Neural Information Processing Systems 33 (2020): 22045-22055. (Year: 2020).*

(Continued)

*Primary Examiner* — Randall K. Baldwin
(74) *Attorney, Agent, or Firm* — Nicholas Park

(57) ABSTRACT

A method of optimizing a neural network model, performed by a neural network model optimization device, may include removing an activation function included in one of a consecutive first block and second block, fusing batch normalization function and a fully connected layer included in a block included in the neural network model, and fusing the first block and the second block.

3 Claims, 7 Drawing Sheets

(56)     References Cited

OTHER PUBLICATIONS

Chitty-Venkata et al. "Calibration data-based CNN filter pruning for efficient layer fusion." 2020 IEEE 22nd International Conference on High Performance Computing and Communications; IEEE 18th International Conf on Smart City; IEEE 6th International Conf on Data (2020) (Year: 2020).*

Amir Ben Dror, "Layer Folding: Neural Network Depth Reduction using Activation Linearization", arXiv preprint arXiv:2106.09309, Sep. 3, 2021.

Ji Liu, "UPDP: A Unified Progressive Depth Pruner for CNN and VisionTransformer", arXiv:2401.06426, Jan. 12, 2024.

KIPO, Decision to Grant a Patent for Korean Patent Application No. 10-2024-0061725, Jan. 22, 2025.

KIPO, Notice of Refusal to Grant a Patent for Korean Patent Application No. 10-2024-0061725, Jul. 10, 2024.

* cited by examiner

FIG. 6

| Description | N-order Layer | ReLU Reduction | Layer Fusion | GPU Latency (ms) | CPU Latency (ms) |
|---|---|---|---|---|---|
| Conventional model structure | 1 | | | 0.616 | 2.125 |
| FC-BN Fusion | 1 | | √ | 0.42 | 1.942 |
| ReLU Reduction | 1 | √ | √ | 0.338 | 1.4 |
| Squared Layer Arch. | 2 | √ | √ | 0.337 | 1.178 |
| Quantization | PTQ | | | - | 1.324 |
| | QAT | | | - | 1.331 |

METHOD AND DEVICE FOR OPTIMIZING NEURAL NETWORK MODEL

CROSS-REFERENCE TO RELATED APPLICATION

This application claims priority from and the benefit of Korean Patent Application No. 10-2024-0061725 filed on May 10, 2024, which is hereby incorporated by reference in its entirety.

BACKGROUND

Technical Field

The following example embodiments relate to a method and device for optimizing a neural network model.

Related Art

Machine learning refers to a type of artificial intelligence (AI) that allows a computer to perform prediction tasks, such as regression, classification, and clustering, based on what the computer has learned on its own based on data.

Deep learning refers to a field of machine learning that teaches a computer how humans think and may be defined as a set of machine learning algorithms that attempt to achieve high-level abstraction (task of summarizing key content or function from a large amount of data or complex data) through a combination of various nonlinear transformation methods.

A deep learning structure is a concept that is designed based on artificial neural networks (ANNs). The artificial neural network refers to an algorithm that mathematically models virtual neurons and then simulates them to have learning capability similar to the human brain, and is mainly used for pattern recognition. An artificial neural network model used for deep learning has a structure that is constructed by repeatedly performing linear fitting and nonlinear transformation or activation. The neural network model used for deep learning may include a deep neural network (DNN), a convolutional neural network (CNN), a recurrent neural network (RNN), a restricted Boltzmann machine (RBM), a deep belief network (DBN), and deep Q-networks.

Meanwhile, optimization of a neural network model may represent a process of improving and optimizing the neural network model to achieve better performance, efficiency, and form, or to meet specific requirements.

To optimize the neural network model, various technologies and methods are used to achieve various goals. Optimization methods may include 'performance optimization' to improve the performance of a deep learning model, 'model size optimization' to reduce a model size, 'inference time optimization' to improve a model inference speed, and 'memory/energy optimization'.

However, most of the conventional optimization methods are methods for finding a minimum value of a loss function of the neural network model, and technological development for the remaining methods are insufficient.

SUMMARY

At least one example embodiment provides a method and device for optimizing a neural network model by adjusting the number of hidden layers.

However, subjects to be achieved by the present invention are not limited to those described above, and still other subjects not described herein will be clearly understood by one of ordinary skill in the art to which the present invention pertains from the following description.

According to an example embodiment, there is provided a A method of optimizing a neural network model, performed by a neural network model optimization device, the method including fusing batch normalization function and a fully connected layer included in a block included in the neural network model; removing an activation function included in one of a consecutive first block and second block; and when the activation function is absent in the first block, fusing the first block and the second block.

The fusing of the fully connected layer and the batch normalization may include generating a fusion layer by fusing the fully connected layer and the batch normalization.

The generating of the fusion layer may generate the fusion layer in both a case in which the fully connected layer and the batch normalization are sequentially arranged and a case in which the batch normalization and the fully connected layer are sequentially arranged.

The fusing of the first block and the second block may include fusing a first layer included in the first block and a second layer included in the second block.

A third block generated by fusing the first block and the second block may include a third layer in which the first layer and the second layer are fused and an activation function included in the second block.

The method may further include reducing the number of hidden layers included in the neural network model.

The reducing of the number of hidden layers may include reducing the number of hidden layers such that the smaller number of hidden layers are arranged according to an increase in the hidden layer order.

The number of hidden layers may decrease based on a hidden layer order.

According to another example embodiment, there is provided a neural network model optimization device including a memory configured to store a neural network model optimization program for optimizing a neural network model; and a processor configured to control the memory, wherein the processor is configured to fuse batch normalization function and a fully connected layer included in a block included in the neural network model, to remove an activation function included in one of a consecutive first block and second block, and to when the activation function is absent in the preceding first block, fuse the first block and the following second block.

The processor may generate a fusion layer by fusing the fully connected layer and the batch normalization.

When fusing the first block and the second block, the processor may fuse a first layer included in the first block and a second layer included in the second block.

The processor may reduce the number of hidden layers included in the neural network model.

The processor may reduce the number of hidden layers such that the smaller number of hidden layers are arranged according to an increase in the hidden layer order.

According to example embodiments, by reducing the number of neurons of a hidden layer (reducing connection between hidden layers), and reducing the number of hidden layers through fusing layers within a block and fusing blocks, it is possible to optimize the structure of a neural network model and to improve an inference speed of the neural network model.

Effects achievable from the present disclosure are not limited to those described above and other effects not described herein may be clearly understood by one of ordinary skill in the art from the following description.

BRIEF DESCRIPTION OF THE DRAWINGS

Various aspects are described with reference to the accompanying drawings and, herein, like reference numerals refer to like elements throughout. In the following example embodiments, numerous specific details are set forth herein to provide thorough understanding of at least one aspect for the purpose of explanation. However, it will be apparent that such aspect(s) may be practiced without the specific details. In other examples, known structures and devices are illustrated in a form of a block diagram to easily describe at least one aspect:

FIG. 6 is a table showing the effect when optimizing a neural network model using a neural network model optimization device according to an example embodiment.

DETAILED DESCRIPTION

The advantages and features of the present invention and the methods for achieving the same will become apparent with example embodiments described in detail below with reference to the accompanying drawings. However, the present invention is not limited to the example embodiments disclosed below and may be implemented in various different forms, and the example embodiments are simply provided to complete the disclosure of the present invention and to fully inform one of ordinary skill in the art of the scope of the invention and the present invention is defined by the scope of the claims.

When it is determined that detailed description related to a known function or configuration may unnecessarily obscure the gist of the present invention in describing example embodiments of the present invention, the detailed description will be omitted. The terms described below are terms defined in consideration of functions in the example embodiments of the present invention and may vary depending on intent of a user or an operator, custom, and the like. Therefore, the definition needs to be made based on the contents throughout the present specification.

Figure 1:
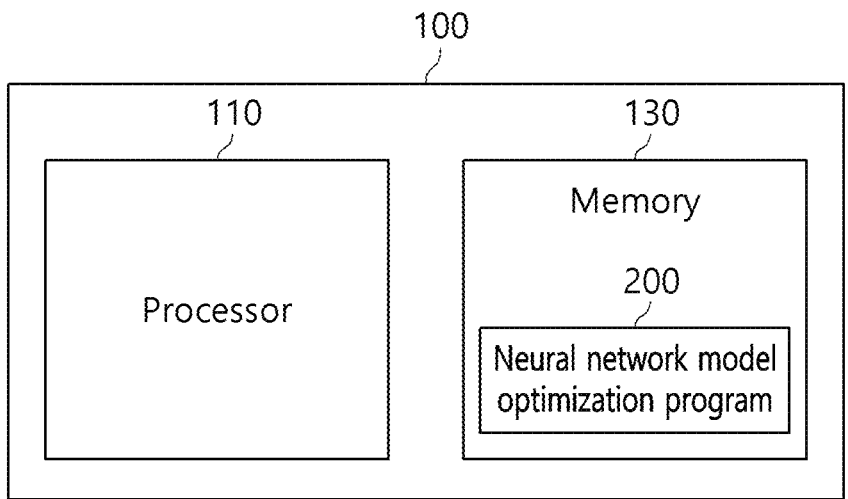
FIG. 1 is a block diagram illustrating a neural network optimization device according to an example embodiment.

FIG. 1 is a block diagram illustrating a neural network model optimization device according to an example embodiment.

Referring to FIG. 1, a neural network model optimization device 100 relates to optimizing a neural network model by adjusting the number of hidden layer neurons and the number of hidden layers included in the neuron network model, and may include a processor 110 and a memory 130.

The processor 110 may control the overall operation of the neural network model optimization device 100.

The memory 130 may store a neural network model optimization program 200 and information required to execute the neural network model optimization program 200.

Herein, the neural network model optimization program 200 may represent software that includes instructions programmed to optimize the neural network model by adjusting the number of hidden layer neurons and the number of hidden layers included in the neuron network model.

To execute the neural network model optimization program 200, the processor 110 may load the neural network model optimization program 200 and information required to execute the neural network model optimization program 200 from the memory 130.

The processor 110 may optimize the neural network model by executing the neural network model optimization program 200.

The function and/or operation of the neural network model optimization program 200 will be described in detail with reference to FIG. 2.

Figure 2:
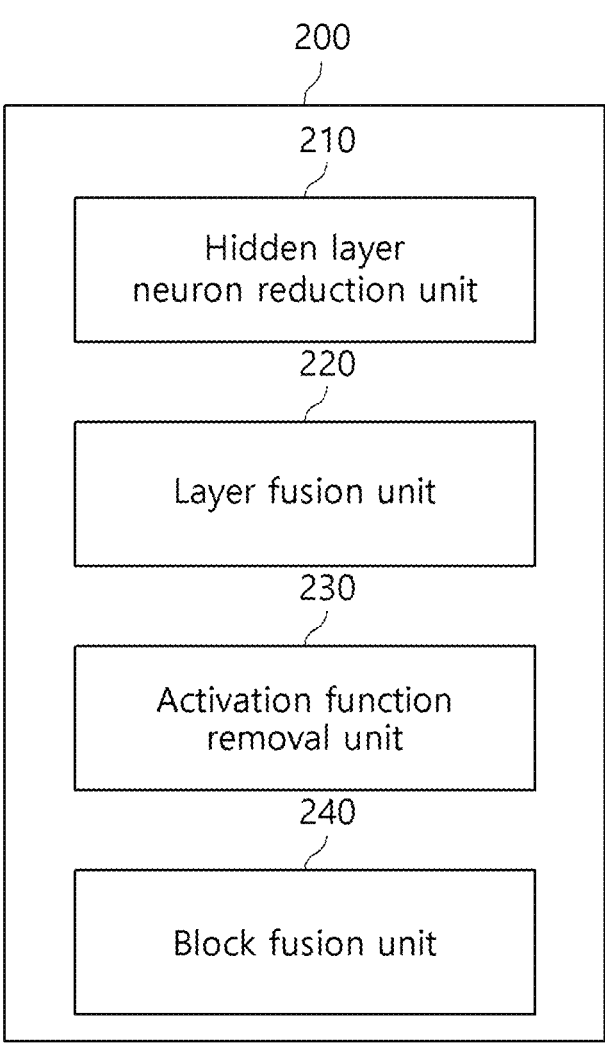
FIG. 2 is a block diagram conceptually illustrating the function of a neural network model optimization program according to an example embodiment.
Figure 3:
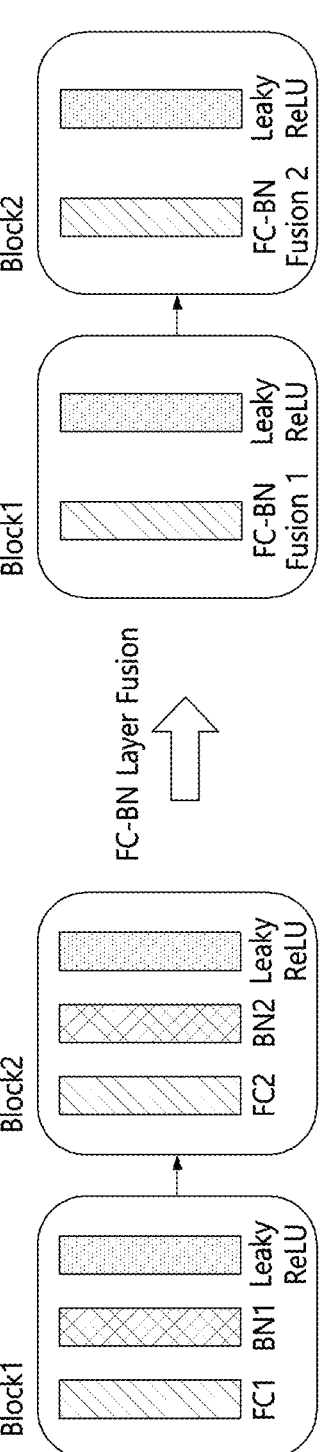
FIG. 3 illustrates an example of a layer fusion unit that fuses layers according to an example embodiment.
Figure 4:
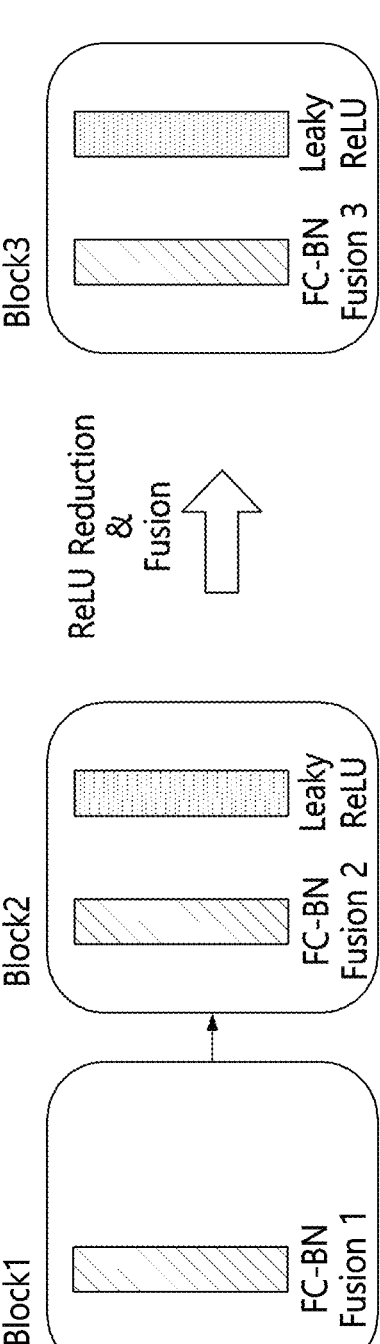
FIG. 4 illustrates an example of a block fusion unit that fuses blocks according to an example embodiment.

FIG. 2 is a block diagram conceptually illustrating the function of a neural network model optimization program according to an example embodiment, FIG. 3 illustrates an example of a layer fusion unit that fuses layers according to an example embodiment, and FIG. 4 illustrates an example of a block fusion unit that fuses blocks according to an example embodiment.

Referring to FIG. 2, a neural network model optimization program 200 may include a hidden layer neuron reduction unit 210, a layer fusion unit 220, an activation function removal unit 230, and a block fusion unit 240, and one of ordinary skill in the art will understand that a series of operational processes do not proceed in the order of indication numbers.

The hidden layer neuron reduction unit 210, the layer fusion unit 220, the activation function removal unit 230, and the block fusion unit 240 shown in FIG. 2 are acquired by conceptually dividing the function of the neural network model optimization program 200, to easily explain the function of the neural network model optimization program 200, and is not limited thereto. Depending on example embodiments, the function of each of the hidden layer neuron reduction unit 210, the layer fusion unit 220, the activation function removal unit 230, and the block fusion unit 240 may be fused/separated, and may be implemented as a series of instructions included in a single program. Also, a series of operational order of elements may not be performed in order of indication numbers and actual implementation will be described in more detail below.

The hidden layer neuron reduction unit 210 may reduce the number of hidden layer neurons (size of hidden layer) included in the neural network model.

In more detail, the hidden layer neuron reduction unit 210 may reduce the number of hidden layer neurons (hidden layer size) such that the smaller number of hidden layer neurons may be arranged according to a decrease in the hidden layer order (in detail, hidden layer closer to output).

Depending on example embodiments, the hidden layer neuron reduction unit 210 may reduce the number of hidden layer neurons (hidden layer size) such that the number may form nonlinearity with respect to the hidden layer order (numerical value assigned to each hidden layer with higher value assigned as it gets closer to input and lower value assigned as it gets closer to output). For example, the hidden layer neuron reduction unit 210 may adjust the number of hidden layer neurons such that the number of hidden layer neurons (hidden layer size) may correspond to the square of the hidden layer order, and may more smoothly reduce the number of hidden layer neurons as the hidden layer order decreases (the closer the hidden layer is to output). Through this, the hidden layer neuron reduction unit 210 may adjust the number of neurons of each hidden layer such that, as the hidden layer order decreases (the closer the hidden layer is to output), interconnection between layers may be reduced, and the interconnection may be more gradually reduced.

The layer fusion unit 220 may fuse a batch normalization and a fully connected layer included in a block.

In detail, when a fully connected layer, a batch normalization, and an activation function (e.g., rectified linear unit (ReLU)) are included in a single block, the layer fusion unit 220 may fuse the fully connected layer and the batch normalization such that a layer in which the fully connected layer and the batch normalization are fused (hereinafter, fusion layer) and the activation function (e.g., ReLU) may be present in a single block.

For example, further referring to FIG. 3, the layer fusion unit 220 may generate a first fusion layer (FC-BN Fusion 1) by fusing a first fully connected layer (FC1) and a first batch normalization (BN1) included in a first block (Block1) and may generate a second fusion layer (FC-BN Fusion 2) by fusing a second fully connected layer (FC2) and a second batch normalization (BN2) included in a second block (Block2).

Equation 1 below may show that, when a fully connected layer and a batch normalization are sequentially arranged in a single block, the fully connected layer and the batch normalization may be fused.

$$f(X) = XW + b, \, g(X) = \frac{X - E[X]}{\sqrt{\text{Var}[X] + \epsilon}}\gamma + \beta = \frac{X - \mu}{\sqrt{\sigma^2 + \epsilon}}\gamma + \beta \quad \text{[Equation 1]}$$

$$g(f(X)) = \frac{XW + b - \mu}{\sqrt{\sigma^2 + \epsilon}}\gamma + \beta = X\frac{W}{\sqrt{\sigma^2 + \epsilon}}\gamma + \frac{b - \mu}{\sqrt{\sigma^2 + \epsilon}}\gamma + \beta = X\hat{W} + \hat{b}$$

Here, X denotes input data, W denotes a fully connected layer weight, b denotes fully connected layer bias, $\gamma$ denotes batch normalization scaling, $\beta$ denotes batch normalization bias, $\mu$ denotes batch mean, $\sigma$ denotes batch deviation, $\epsilon$ denotes an arbitrary constant that does not allow the denominator to be zero (e.g., 1e-5 may be used), f denotes the fully connected layer, and g denotes the batch normalization.

That is, since the fusion layer (g(f(X)) in which the fully connected layer and the batch normalization are fused is in the same form as the fully connected layer, it may perform the same function as before fusion although the fully connected layer and the batch normalization are sequentially fused. This is because the fully connected layer and the batch normalization may allow a matrix multiplication operation using running mean and var during inference.

On the contrary, Equation 2 below may show that, when the batch normalization and the fully connected layer are sequentially arranged in a single block, the batch normalization and the fully connected layer may be fused.

$$f(X) = XW + b, \, g(X) = \frac{X - E[X]}{\sqrt{\text{Var}[X] + \epsilon}}\gamma + \beta = \frac{X - \mu}{\sqrt{\sigma^2 + \epsilon}}\gamma + \beta \quad \text{[Equation 2]}$$

$$f(g(x)) =$$

$$\left(\frac{X - \mu}{\sqrt{\sigma^2 + \epsilon}}\gamma + \beta\right)W + b = \frac{X}{\sqrt{\sigma^2 + \epsilon}}\gamma W - \frac{\mu}{\sqrt{\sigma^2 + \epsilon}}\gamma W + \beta W + b = X\hat{W} + \hat{b}$$

Here, X denotes input data, W denotes a fully connected layer weight, b denotes fully connected layer bias, $\gamma$ denotes batch normalization scaling, $\beta$ denotes batch normalization bias, $\mu$ denotes batch mean, $\sigma$ denotes batch deviation, $\epsilon$ denotes an arbitrary constant that does not allow the denominator to be zero (e.g., 1e-5 may be used), f denotes the fully connected layer, and g denotes the batch normalization.

As in Equation 1, in Equation 2, the fusion layer (f(g(x)) in which the batch normalization and the fully connected layer are fused is in the same form as the fully connected layer. Therefore, although the batch normalization and the fully connected layer are sequentially merged, the same function as before fusion may be performed.

In the example presented in FIG. 3, it is described that fusion is performed in a state in which an activation function is not removed through the activation function removal unit 230. However, the example embodiment is not limited thereto, and the layer fusion unit 220 may fuse the fully connected layer and the batch normalization regardless of presence or absence of the activation function.

According to an example embodiment, the activation function removal unit 230 may remove an activation function of a preceding block among consecutive blocks. For example, referring to FIG. 4, between a first block (Block1) and a second block (Block 2) that are consecutive blocks in which layers are fused through the layer fusion unit 220, the activation function removal unit 230 may remove an activation function (Leaky ReLU) included in the first block (Block1) corresponding to the preceding block. According to removed results, consecutive blocks in the structure shown on the left side of FIG. 4 may be implemented.

If a predetermined condition is satisfied, the block fusion unit 240 may fuse two adjacent blocks. In detail, since the activation function of the preceding block among the consecutive blocks is removed through the activation function removal unit 230, it may be determined that the predetermined condition is satisfied.

In detail, when the activation function, such as ReLU, is absent in the preceding (previous order of) block is absent, the block fusion unit 240 may fuse the preceding block and a succeeding (subsequent order of) block and may fuse a fusion layer included in the preceding block and a fusion layer included in the succeeding (subsequent order of) block.

For example, further referring to FIG. 4, since only a first fusion layer (FC-BN Fusion 1) is included and the activation function is not included in the first block (Block1), the block fusion unit 240 may generate a third block (Block3) by fusing the first block (Block1) and the second block (Block2), and may generate a third fusion layer (FC-BN Fusion 3) by fusing the first fusion layer (FC-BN Fusion 1) and a second fusion layer (FC-BN Fusion 2) included in the succeeding (subsequent order of) block. Therefore, the third fusion layer (FC-BN Fusion 3) and the activation function (Leaky ReLU) already included in the second block (Block2) may be included in the third block (Block3).

As shown in Equation 3 below, although two fully connected layers are fused into one, the same function as before fusion may be performed and the activation function does not need to be present in all blocks.

$$f(X) = (XW_1 + b_1)W_2 + b_2 = XW_1W_2 + b_1W_2 + b_2 = X\hat{W} + \hat{b} \quad \text{[Equation 3]}$$

In actual implementation, the operations of the hidden layer neuron reduction unit 210 and the activation function removal unit 230 described above may be repeatedly performed in a neural network model training process, and the neural network model of which training is completed may determine the optimal number of neurons and the minimum number of activation functions. That is, the operations of the hidden layer neuron reduction unit 210 and the activation function removal unit 230 may be optimization operations for a training process.

Also, the operations of the layer fusion unit 220 and the block fusion unit 240 may correspond to the optimization operations applied to the neural network model in an inference process using the neural network model of which training is completed. That is, the layer fusion unit 220 and the block fusion unit 240 may be the optimization operations for the inference process.

Figure 5:
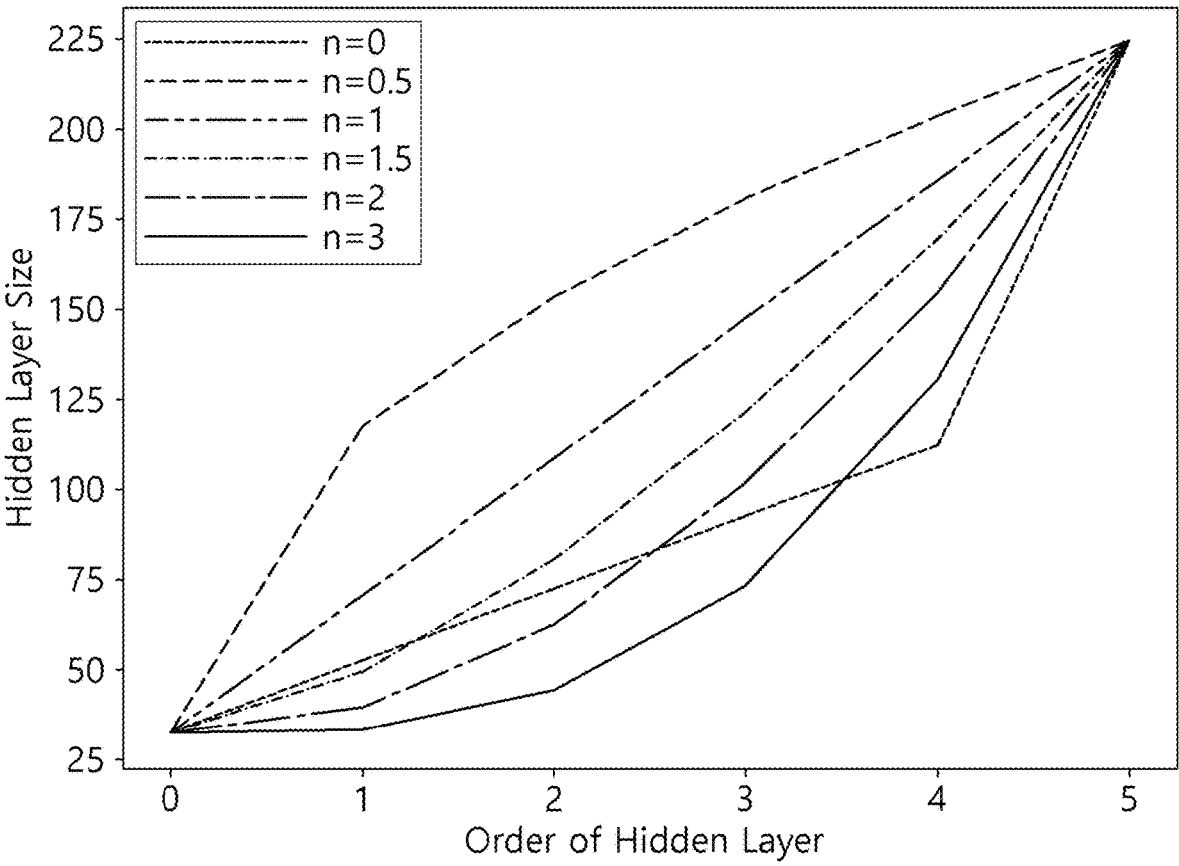
FIG. 5 is a graph showing the number of cases of reducing the number of hidden layers according to an example embodiment.

FIG. 5 is a graph showing the number of cases of reducing the number of hidden layers according to an example embodiment.

Referring to FIG. 5, n denotes n-squared as the number of hidden layers being reduced.

In the conventional case, the same number of hidden layers were present for each order without a decrease in the number of hidden layers, as in the line identified by "n=1".

On the other hand, according to example embodiments herein, according to a decrease in the number of hidden layers as in the line identified by "n=1.5", the line identified by "n=2", and the line identified by "n=3", the total number of operations within a neural network model decreases. Experiments showed that, in the case of reducing the number of hidden layers in 2-squared form as in the line identified by "n=2", the number of operations may be reduced by about 40%, minimizing the decrease in performance.

FIG. 6 is a table showing the effect when optimizing a neural network model using a neural network model optimization device according to an example embodiment.

Referring to FIGS. 2 and 6, in the case of the existing model, GPU latency was 0.616 ms and CPU latency was 2.125 ms, whereas when the layer fusion unit 220 performed neural network model optimization, the GPU latency was reduced to 0.42 ms and the CPU latency was reduced 1.942 ms, when the layer fusion unit 220 and the block fusion unit 230 performed neural network model optimization, the GPU latency was further reduced to 0.338 ms and the CPU latency was further reduced to 1.4 ms, and when all of the hidden layer neuron reduction unit 210, the layer fusion unit 220, the activation function removal unit 230, and the block fusion unit 240 performed neural network model optimization, the GPU latency was 0.337 ms and the CPU latency was 1.178 ms, which were minimum.

Meanwhile, there is quantization that converts weight and activation function output of the neural network model to be expressed in the smaller number of bits among optimization methods of the neural network model. In the case of performing the neural network model optimization using the quantization, the CPU latency is 1.324 ms and 1.331 ms, so it may be verified that the optimization effect is greater when performing the neural network model optimization using all of the hidden layer neuron reduction unit 210, the layer fusion unit 220, the activation function removal unit 230, and the block fusion unit 240.

Figure 7:
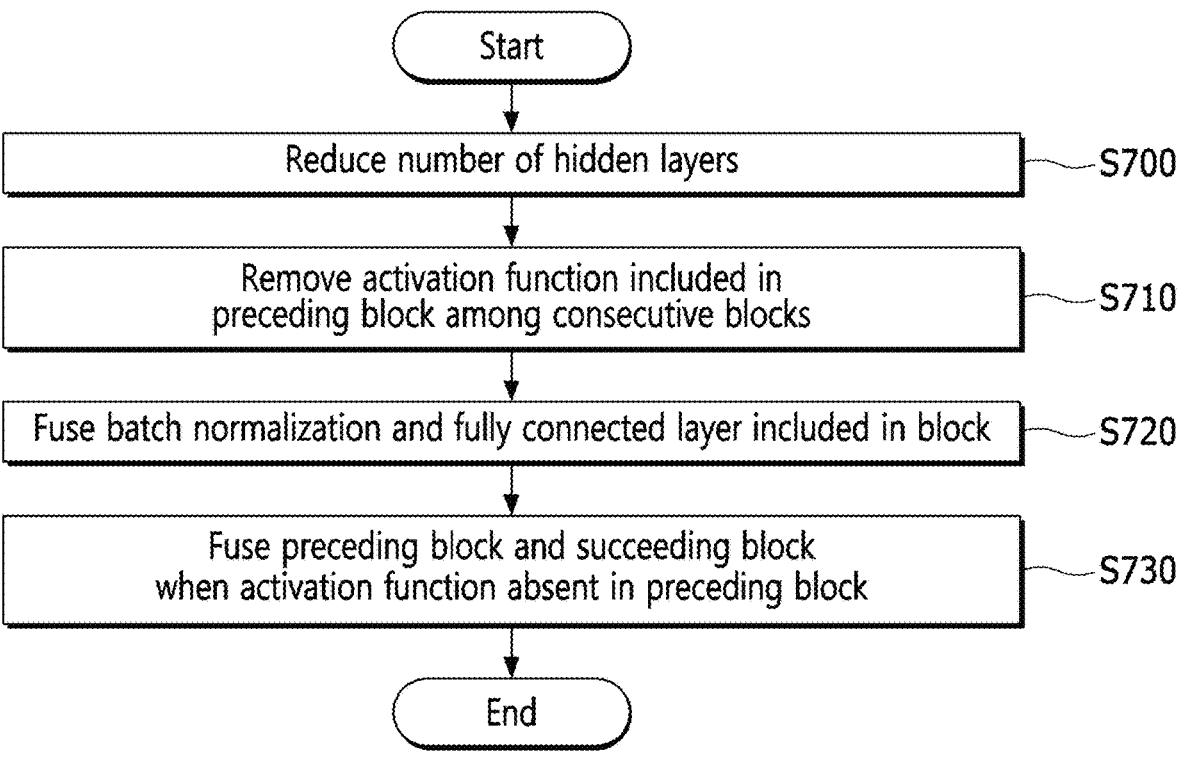
FIG. 7 is a flowchart illustrating a method of optimizing a neural network model using a neural network model optimization program according to an example embodiment.

FIG. 7 is a flowchart illustrating a method of optimizing a neural network model using a neural network model optimization program according to an example embodiment.

Referring to FIGS. 2 and 7, in operation S700, the hidden layer neuron reduction unit 210 may reduce the number of hidden layer neurons included in a neural network model.

In operation S710, the activation function removal unit 230 may remove an activation function present in a preceding block among consecutive blocks.

In operation S720, the layer fusion unit 220 may fuse batch normalization and a fully connected layer included in the block. In operation S730, when the activation function is absent in the preceding block, the block fusion unit 240 may fuse the preceding block and a succeeding (subsequent order) block.

Operations S700 and S710 may be performed in the process of training the neural network model, and operations S720 and S730 may be performed in an inference process using the neural network model of which training is completed.

Meanwhile, for convenience of description, it is described in FIG. 7 that operation S710 of the activation function removal unit 230, operation S720 of the layer fusion unit 220, and operation S730 of the block fusion unit 240 are described after operation S700 of the hidden layer neuron reduction unit 210, but it is not limited thereto. That is, depending on example embodiments, operation S700 of the hidden layer neuron reduction unit 210 and operation S710 of the activation function removal unit 230, operation S720 of the layer fusion unit 220, and/or operation S730 of the block fusion unit 240 may be independently performed.

According to example embodiments, by reducing the number of hidden layer neurons, fusing layers within a block, and fusing blocks, it is possible to optimize the structure of a neural network model and to improve an inference speed of the neural network model.

Combinations of the respective blocks of the block diagram and the respective operations of the flowchart attached herein may be performed by computer program instructions. The computer program instructions may be embedded in an encoding processor of a general-purpose computer, a special-purpose computer, or other programmable data processing equipment. Therefore, the instructions performed through an encoding processor of the computer or other programmable data processing equipment generate methos of performing functions described in the respective blocks of the block diagram or the respective operations of the flowchart. The computer program instructions may also be stored in a computer-available or computer-readable memory that may direct the computer or other programable data processing equipment to implement the function with a specific method. Therefore, the instructions stored in the computer-available or computer-readable memory may also product a manufacture item that includes an instruction method for performing a function described in each block of the block diagram or each operation of the flowchart. Since the computer program instructions may also be installed on the computer or other programmable data processing equipment, instructions for performing the computer or other programmable data processing equipment in such a manner that a series of operations are performed on the computer or other programmable data processing equipment may provide operations for executing functions described in the respective blocks of the block diagram and the respective operations of the flowchart.

Also, each block or each operation may represent a portion of a module, a segment, or a code that includes one or more executable instructions for executing specified logical function(s). Also, in some alternative example embodiments, it should be noted that functions described in blocks or operations may occur out of order. For example, two blocks or operations illustrated in succession may be substantially performed at the same time, or the blocks or the operations may sometimes be performed in reverse order depending on a corresponding function.

The above description is simply an example of the technical spirit of the present invention and one skilled in the art will appreciate that various modifications and alterations may be made to the example embodiments without departing from the technical spirit of the present invention. Therefore, the example embodiments disclosed herein are not intended to limit the technical spirit of the present invention but to explain it, and the scope of the technical spirit of the present invention is not limited by the example embodiments. The protection scope of the present invention should be interpreted by the claims and all the technical spirit that falls within the equivalent scope thereof should be interpreted to be included in the scope of rights of the present invention.

What is claimed is:

1. A method of optimizing a neural network model, performed by a neural network model optimization device, the method comprising:

removing an activation function included in one of a consecutive first block and second block;

fusing batch normalization function and a fully connected layer included in a block included in the neural network model; and fusing the first block and the second block, wherein the fusing the first block and the second block comprises fusing the first block and the second block if an activation function is absent in the first block and an activation function is present in the second block, wherein the fusing of the first block and the second block comprises fusing a first layer included in the first block and a second layer included in the second block, and a third block generated by fusing the first block and the second block includes a third layer in which the first layer and the second layer are fused and an activation function included in the second block, wherein the method further comprising:

reducing the number of hidden layers included in the neural network model based on a hidden layer order, wherein the hidden layer order is numerical value assigned to each hidden layer with higher value assigned as it gets closer to input of the neural network model and lower value assigned as it gets closer to output of the neural network model, wherein the number of hidden layers is adjusted such that the number of hidden layers corresponds to square of the hidden layer order.

2. The method of claim 1, wherein the fusing of the fully connected layer and the batch normalization comprises generating a fusion layer by fusing the fully connected layer and the batch normalization function.

3. A neural network model optimization device comprising:

a memory configured to store a neural network model optimization program for optimizing a neural network model; and a processor configured to control the memory, wherein the processor is configured to, remove an activation function included in one of a consecutive first block and second block, fuse batch normalization function and a fully connected layer included in a block included in the neural network model, and fuse the first block and the second block if an activation function is absent in the first block and an activation function is present in the second block, wherein the processor is further configured to, fuse a first layer included in the first block and a second layer included in the second block, and a third block generated by fusing the first block and the second block includes a third layer in which the first layer and the second layer are fused and an activation function included in the second block, wherein the processor is further configured to, reduce the number of hidden layers included in the neural network model based on a hidden layer order, wherein the hidden layer order is numerical value assigned to each hidden layer with higher value assigned as it gets closer to input of the neural network model and lower value assigned as it gets closer to output of the neural network model, wherein the number of hidden layers is adjusted such that the number of hidden layers corresponds to square of the hidden layer order.

* * * * *